M. A. STEVENS.
BROODER.
APPLICATION FILED JULY 21, 1916.

1,222,901.

Patented Apr. 17, 1917.

WITNESSES
Roland T. Williams.
Wm. F. Freeman

INVENTOR
Mary A. Stevens
BY Richard Stevens

ATTORNEY

UNITED STATES PATENT OFFICE.

MARY A. STEVENS, OF STOCKTON, KANSAS.

BROODER.

1,222,901.

Specification of Letters Patent.

Patented Apr. 17, 1917.

Application filed July 21, 1916. Serial No. 110,571.

*To all whom it may concern:*

Be it known that I, MARY A. STEVENS, a citizen of the United States, residing at Stockton, in the county of Rooks and State of Kansas, have invented certain new and useful Improvements in Brooders, of which the following is a specification.

This invention has relation to chicken brooders, and the nature and objects thereof will be readily apparent to those skilled in the art to which it appertains, in the light of the following explanation of the accompanying drawings illustrating what I now believe to be the preferred embodiment, or mechanical expression, of my invention, from among other forms and arrangements thereof within the spirit of the invention and the scope of the appended claims.

However, an object of the invention is to provide a brooder for young chickens and having compartments, designed for housing and feeding the chickens, with means for controlling their passage from one compartment to another, the feeding compartment being in the form of a cage and having detachable feeding and watering troughs, the brooder also embodying a novel means whereby the same is subjected throughout to a uniform temperature.

In addition to the foregoing, my invention comprehends improvements in the details of construction and arrangement of parts to be hereinafter described and particularly pointed out in the appended claims.

In the accompanying drawings, in which similar and corresponding parts are designated by the same characters of reference, throughout the several views in which they appear:

Figure 1:
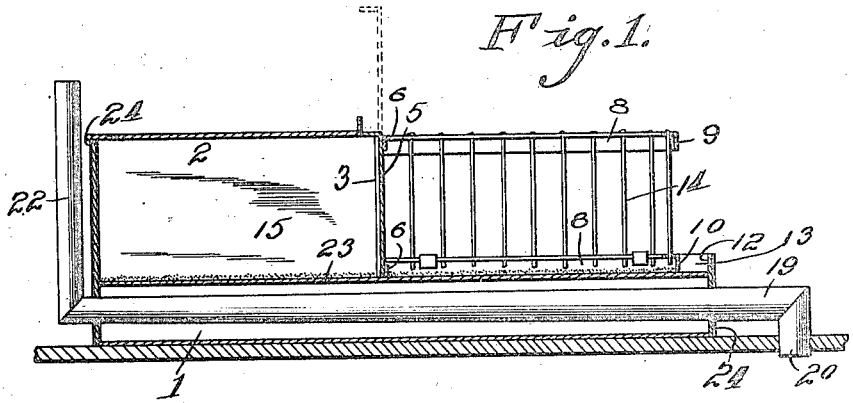
Figure 1, is a longitudinal sectional view of a brooder constructed after the manner of my invention.
Figure 2:
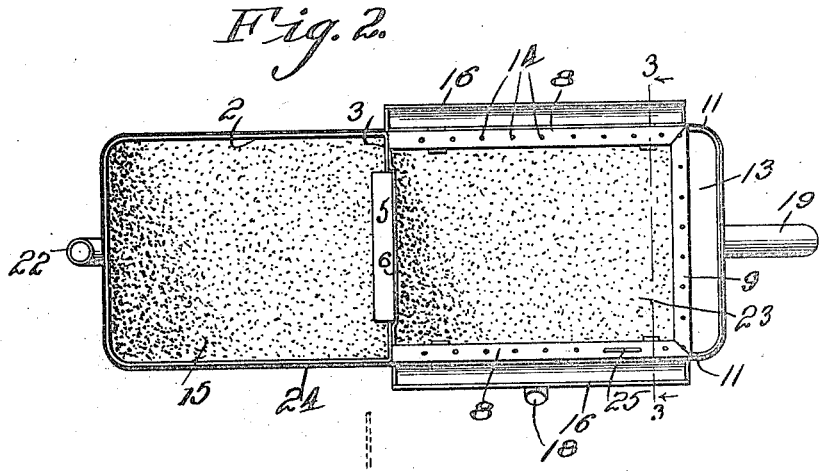
Fig. 2, is a view thereof in plan with cover removed.

With reference to the drawings, 1 indicates a flat oblong container, the walls at one end of which are extended vertically as at 2 and horizontally to a distance intermediate the ends of the container and formed transversely at that point with a vertical partition 3. An opening 4 is formed in the partition and the same may be closed at will by means of a gate or the like 5 mounted for vertical movement in horizontal and vertical guide strips 6 and 7 respectively provided upon the partition.

A cage-like structure is superposed upon the container 1 and is formed of horizontal angular frame bars 8 disposed in superposed spaced relation and forming a continuation of the walls 2, the ends of the bars at the end of the container opposite the wall structure 2 are connected by upper and lower horizontal end bars 9 and 10 respectively. The lower bar 10 extends transversely across the container and is adapted to connect the ends 11 of a wall 12 formed by continuing the end wall and a portion of the side wall to a short vertical distance, a trough 13 being thus defined. The horizontal bars are connected by spaced vertical rods 14 thereby defining a feeding compartment which may be placed in communication with the sleeping compartment 15 formed by the above described walls 2.

Longitudinally extending troughs for water or feed are detachably connected to opposite sides of the member 1, and extend from end to end of the above described cage-like structure, the troughs being indicated at 16. The troughs are readily accessible to the young chickens through the vertical rods of the cage.

The interior of the container 1 may be supplied with water through a filling tube 17 provided at one side of the container in communication therewith and closed by a cap 18. A tube 19 is extended through the interior of the container, projecting beyond the ends and provided at one end with a down turned portion 20 to receive the heat of a lamp (not shown), the other end of the tube being bent upwardly as at 22 to serve as a flue to carry away products of combustion. In this manner the water within the container is soon heated and may be kept at a uniform temperature to warm the floor 23 forming the top of the container. A covering 24 of asbestos or other heat non-conducting material may be applied to the vertical sides of the container and the walls 2 thereof whereby the heat is retained. Obviously if desired any other method of heating the interior of the container may be employed than the one hereindescribed.

Figure 3:
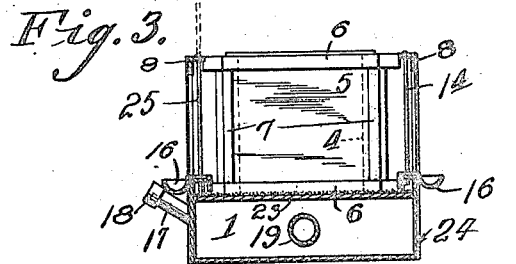
Fig. 3, is a transverse sectional view taken on the line 3—3 of Fig. 2.

In practice, the brooder may be placed within a box or a small chicken house, or the sleeping compartment 15 may be provided with a cover. The chickens are comfortably housed within the sleeping compartment and protected from chills, and when they are to be fed, the gate 5 may be raised, thereby permitting the exit of the chickens from the said compartment into the cage-like feeding compartment which is open at the top but the sides of which are too high to permit the chickens leaping thereover. The cage-like compartment may be provided with an exit by connecting the upper ends of a pair of rods as indicated at 25, the same being movable vertically and permitting the exit of chickens when they arrive at the proper size. The vertically movable rods 25 are shown to advantage in Fig. 3.

While I have illustrated and described my invention with some degree of particularity, I realize that in practice various alterations thereover may be made, and I therefore reserve the right and privilege of changing the form of the details of construction and arrangement of parts within the spirit of the invention or the scope of the appended claims.

Having thus described my invention what I claim as new and desire to secure by Letters Patent is:

1. A brooder in the form of a closed container the sides of which are extended upwardly for one-half its length, a transverse partition connecting the sides at the central portion of the container to form with said sides a sleeping compartment, an opening provided in said partition, a cage-like structure superposed upon the unoccupied portion of the container to form a feeding compartment the same being in communication with the sleeping compartment, and a heating pipe extending through the interior of the container.

2. A brooder formed of sheet metal and including a flat container portion adapted to be filled with water and having the sides thereof for one-half its length extended upward, a transverse partition connecting the edges of the extended portions, said partition having an opening and a gate for controlling said opening, a partition extended across the opposite end of the brooder to form with the end wall thereof a trough, a cage structure superposed upon the brooder outside the first mentioned partition to form a feeding compartment, a covering of asbestos around the upwardly extended walls, and a heating pipe extended through the container whereby to heat the water therein and thereby heat the floor of the brooder.

In testimony whereof I affix my signature in presence of two witnesses.

MARY A. STEVENS.

Witnesses:
 RUBY SWEET,
 H. C. SWEET.